United States Patent Office 3,252,807
Patented May 24, 1966

3,252,807
PREPARATION OF YEAST-RAISED BAKERY PRODUCTS UTILIZING AN ISOLATED SOY PROTEIN
Simpey Kuramoto, St. Louis Park, Minn., assignor of one-half to General Mills, Inc., a corporation of Delaware, and one-half to J. R. Short Milling Company, a corporation of Illinois
No Drawing. Filed Apr. 30, 1962, Ser. No. 191,324
7 Claims. (Cl. 99—90)

The present invention relates to an isolated soy protein for use in bakery products, to the process for preparing the same and to bakery products containing said isolated soy protein.

Increasing the protein content of edible food products has become of great importance in the past few years. Such high protein products have higher consumer acceptance, both for health reasons and for economic reasons. Therefore, it is very desirable to increase the protein content of bakery products and, more particularly of bakery products prepared from yeast raised doughs. A source of relatively cheap and edible protein is available from soybeans. However, conventional protein isolates of soybean origin have a marked loaf volume depressing action along with other deleterious effects on the crumb and crust of bakery products containing the same.

Accordingly, it is an object of the present invention to prepare an isolated soy protein for use in bakery products which does not have the disadvantages of the soy isolates previously available.

It is still another object of the invention to provide a process for preparing isolated soy proteins of improved properties.

A further object of this invention is to provide high protein containing bakery products of improved properties.

Other objects will become apparent to those skilled in the art from the following detailed description.

Broadly, the present invention comprises the process of treating isolated soy protein with a copper material to produce a protein which can be added to yeast raised doughs without causing deleterious effects.

The isolated soy protein, prior to treatment according to the present invention, is prepared by conventional procedures. Thus, the oil from the soybean flakes is extracted with a petroleum solvent and/or an alcohol. A suitable petroleum solvent is hexane. The hexane extracted flakes should be processed at low temperatures and the desolventizing, that is the removal of the hexane, is accomplished at temperatures not over about 170° F. by means of vapor desolventizing. The removal of the hexane may be accomplished by use of a system whereby the hexane-wet flakes are subjected to a continuous stream of super-heated hexane vapors in a closed system. Other desolventizers, such as vacuum, warm air drying, and the like may be used provided the flakes are rapidly desolventized at low temperatures so that the proteins are not excessively heat denatured.

The hexane extracted flakes are then further extracted with an alcohol in order to remove bitter ingredients. Suitable alcohols are ethanol and isopropanol. Aqueous solutions of said alcohols may be used, the azeotropic solutions being preferred. After the alcohol washing, the flakes should be desolventized by superheated alcohol vapors in a similar manner as with the hexane extraction. The other desolventizers, set forth hereinabove with respect to hexane removal, may also be employed for alcohol removal.

Instead of petroleum solvent extraction followed by alcohol treatment, the soy bean flakes may be subjected to alcohol extraction alone. The alcohol should be kept at or below its boiling point. The same alcohols and the same procedures for desolventizing as described hereinabove may be employed. However, in all alcohol-desolventiziing systems where a single unit is used, traces to 2% of alcohol remain on the flakes when they are discharged from the apparatus. Aeration of the flakes upon being removed from the apparatus by carrying them through an air cyclone system operating at room temperature will effectively remove the alcohol from those flakes having only traces of alcohol content. Air heated to temperatures in proportion to the alcohol content in the flakes is required to remove alcohol when higher concentrations are present.

Obviously where the oil has been extracted from the flakes by means of alcohol, it is not necessary to wash said flakes with an alcohol after the completion of the extraction operation.

The hexane and/or alcohol extracted flakes which are free of solvent are then extracted with water. The flakes are slurried in the water and the pH adjusted to 6.5–9.5. The amount of water used is not critical. However, it is preferred to use 10–20 parts by weight of water to 1 part by weight of flakes. The temperature of the water extraction is likewise not critical although, from an economic standpoint, it is preferred to keep the slurry at a temperature of from 20° C. to 40° C., 35° C. being particularly preferred. The slurry is held at the above temperatures for a time sufficient to extract substantially all of the soluble protein materials. The insolubles are removed by ordinary means such as filtration or centrifugation, the latter method being preferred. The insoluble portion can be further extracted by water, if desired, to remove any remaining soluble material and this extract added to that previously separated.

The pH of the water extract is then adjusted to about 4.5–5.2 by the addition of a suitable acidic material, such as acetic acid. The protein precipitates from the extract upon the above pH adjustment and is separated from the soluble liquor by conventional means, preferably by centrifugation.

The precipitate, as prepared above, is then conventionally dried without further treatment. However, according to the process of the present invention, the precipitate is treated with metallic copper, copper containing alloys or copper salts prior to and/or during the drying thereof. The precipitate, in the form of a glutenous cake, is repulped in water and throughly washed by vigorous agitation and the protein again recovered, preferably by centrifugation. The solids content of the resulting cake is adjusted to about 30 to 50% by weight. The copper compound is preferably added to the precipitated protein either prior to or after the water washing and then the precipitated protein is dried, preferably in a rotary drier using an inlet temperature of about 60° C. Other suitable temperatures may also be used as well as other drying methods—i.e., rotary drum, forced air tray and vacuum shelf drying. Alternatively, the precipitated protein may be treated with the copper compound during the drying operation. Thus, the drier may be partially or fully lined with the copper compound, particularly with metallic copper or copper containing alloys. The dried produce is the improved soy protein of the present invention.

The copper material can be metallic copper, alloys thereof with other metals or any of a wide variety of copper salts such as cupric sulfate, cupric carbonate, cupric chloride, cupric glutamate and cupric nitrate. Cuprous salts can also be used, but the cupric salts are preferred. The copper material is used in an amount sufficient to substantially eliminate the volume depressing action of the dried, isolated soy protein when used in yeast raised doughs. The amount used will ordinarily be about 30 to 150 p.p.m. Cu based on the solids content of precipitate prior to the drying step.

The improvement in the isolated soy protein produced according to the process of the present invention is believed to be due to oxidation, promoted by the copper material, of protein sulfhydryls to disulfides, causing crosslinking of the protein molecules. Thus it is theorized that the following reaction takes place:

$$4R\!-\!S\!-\!H + O_2 \rightarrow 2R\!-\!S\!-\!S\!-\!R + 2H_2O$$

wherein R—S—H is the protein molecule prior to processing according to the present invention. Regardless of whether or not the above reaction takes place, the isolated soy protein is vastly improved by my process.

The isolated soy protein of this invention is used to increase the protein content of yeast raised bakery products. The major ingredients used in the preparation of doughs are flour and water. Yeast, sugar, shortening, salt, non-fat milk solids, eggs, baking powder and other ingredients may also be used in the doughs. The soy protein is added in any desired amount. However, it is preferred to add 5–20% by weight based on the weight of the flour and it is particularly preferred to add about 9% by weight.

In the following examples are described the preparations of isolated soy proteins in accordance with this invention and bakery products containing the same. It is to be understood that these examples, given for illustrative purposes only, do not limit the scope of the invention in any way.

EXAMPLE I

Hexane extracted soy flakes were extracted with 88% isopropanol at a solvent to flake ratio of 4:1. Extraction was effected at 35–45° C. for 30 minutes with gentle agitation followed by decanting of alcohol and vacuum desolventizing to remove the last traces of alcohol. The flakes were slurried in water and the pH adjusted to 7–8. The temperature of the slurry was maintained at 35° C. for 30 minutes and then the insolubles were removed by centrifugation and clarification was effected by another pass through the centrifuge. The protein was precipitated from the extract by adjusting the pH to 5.0–5.2 and separated from the soluble liquor by centrifugation. The glutenous cake was removed from the bowl and repulped in water. At this stage copper, as $CuSO_4$, was added so that the slurried precipitate immediately prior to drying contained 100 p.p.m. Cu based on the weight of the solids. The repulped precipitate was thoroughly washed by vigorous agitation and the protein again recovered by centrifugation. The solids content of the cake from the centrifuge was 50%. The cake was dried in a rotary drier using an inlet temperature of 60° C.

EXAMPLES II–VI

The process of Example I was repeated using different concentrations of Cu as $CuSO_4$. Thus Examples II, III, IV, V, and VI were prepared using Cu concentrations of 34, 74, 142, 77 and 40 respectively.

Determination of crosslinking

The extent of sulfhydryl crosslinking was measured by solubility when the protein was dispersed in (1) pH 7.6, $0.5\mu$ phosphate buffer and (2) the same buffer containing 0.01 M mercaptoethanol. As described hereinabove, the copper compound is believed to promote crosslinking of the protein molecules, thus decreasing solubility. Mercaptoethanol reduces any —S—S— crosslinks according to the following reaction:

$$R\!-\!S\!-\!S\!-\!R + HS\!-\!CH_2\!-\!CH_2\!-\!OH \rightarrow$$
$$R\!-\!SH + HO\!-\!CH_2\!-\!CH_2\!-\!S\!-\!S\!-\!R$$

wherein R—S—H represents the protein molecule. This reduction in crosslinks increases solubility.

The isolated soy protein solutions to be tested were prepared by adding the protein to the above described buffer solutions in the ratio of 2 g. of protein to 100 ml. of solution. After peptization, insoluble protein remaining in the buffer systems was removed in a Servall angle centrifuge at $10,000 \times G$. The amount of soluble protein was determined by semimicro Kjeldahl analysis of the clarified solutions. A rating of 100 was set for the amount of protein added to the buffer solution. If all of the protein dissolved, the solubility in the buffer would also be rated as 100.

TABLE I

| Isolated Soy Protein of— | P.p.m. Cu | Solubility In pH 7.6, $0.5\mu$ Phosphate Buffer | Solubility in pH 7.6, $0.5\mu$ Phosphate Buffer plus 0.01 M Mercaptoethanol |
|---|---|---|---|
| Example II | 34 | 96.8 | 100 |
| Example III | 74 | 95.2 | 98.7 |
| Example IV | 142 | 68.5 | 97 |
| Example V | 77 | 55 | 93 |
| Example VI | 40 | 82 | 89 |

As can be seen from the data of Table I, treatment of the isolated soy protein according to the process of the present invention decreases protein solubility.

Bread baking performance

The isolated soy protein was subjected to a standard bread baking test using a high quality wheat flour. The crust was rated according to color and character and the crumb was rated according to color, grain and texture. Optimum values are 10 on these subjective tests. Volume was also measured.

TABLE II

| Sample | Crust | | Crumb | | | |
|---|---|---|---|---|---|---|
| | Color | Character | Color | Grain | Texture | Volume |
| Control (No Soy Protein added) | 10 | 10 | 10 | 10 | 10 | 3,250 |
| Control containing 9% by wt. protein of Ex. IV | 10 | 10 | 8 | 10 | 10 | 3,175 |

The soy proteins of Examples V and VI were used in the preparation of bread using another grade of flour, the results being summarized in Table III.

TABLE III

| Sample | Crust | | Crumb | | | |
|---|---|---|---|---|---|---|
| | Color | Character | Color | Grain | Texture | Volume |
| Flour containing 9% by wt. protein of Ex. V | 10 | 10 | 9D [1] | 9OP [2] | 9 | 2,790 |
| Flour containing 9% by wt. protein of Ex. VI | 11D | 10 | 8 | 6OP | 9 | 2,850 |

[1] D=Dark.
[2] OP=Open.

The above examples show that high quality bread of materially improved protein content can be prepared from flour containing the isolated soy proteins prepared according to my process without serious impairment of the desirable characteristics of the bread.

The embodiments of the invention in which an exclusive property of privilege is claimed are defined as follows:

1. In a process of preparing a yeast raised bakery product of increased protein content wherein an isolated protein is included in a dough and the dough is baked, the improvement comprising using, as the isolated protein, an isolated soy protein prepared by: (1) treating the precipitate obtained by acidifying the aqueous alkaline extract of solvent extracted soybean flakes, said precipitate containing about 30 to 50% by weight solids, with a sufficient amount of a copper material to substantially eliminate the volume depressing action of the isolated soy protein when used as an ingredient in yeast reased doughs, said copper material being selected from the group consisting of copper metal, copper containing alloys and copper salts; and (2) drying said precipitate to obtain the isolated soy protein.

2. The process of claim 1 wherein the copper material is a cupric salt.

3. The process of claim 2 wherein the cupric salt is cupric sulfate.

4. The process of claim 1 wherein the drying (2) is carried out in a rotary drier.

5. The process of claim 4 wherein the inlet temperature of the rotary drier is about 60° C.

6. The process of claim 1 wherein the amount of the copper material is about 30–150 p.p.m. based on the solids content of the precipitate.

7. The process of claim 1 wherein the treating (1) is carried out on a precipitate obtained by acidifying the aqueous alkaline extract of hexane and isopropanol extracted soybean flakes, the copper material is a cupric salt, the said cupric salt is used in an amount of about 30–150 p.p.m. based on the solids content of the precipitate and the drying (2) is carried out in a rotary drier using an inlet temperature of about 60° C.

References Cited by the Examiner

UNITED STATES PATENTS

| | | | |
|---|---|---|---|
| 2,589,867 | 3/1952 | Rowe | 260—123.5 |
| 2,881,159 | 4/1959 | Circle et al. | 99—17 |
| 3,006,765 | 10/1961 | Ferrari | 99—91 X |

OTHER REFERENCES

"Oxidation of Ascorbic Acid," Jour. Biol Chem., vol. 112, 1936, pp. 620 and 631.

"Soybeans and Soybean Products," by Markley, vol. II, Interscience Publishers, Inc., New York, 1951, pp. 957–960.

A. LOUIS MONACELL, *Primary Examiner.*

BEATRICE H. STRIZAK, *Examiner.*